Patented July 14, 1953

2,645,650

UNITED STATES PATENT OFFICE 2,645,650

PRODUCTION OF OILSEED FLAKES

Arnold L. Ayers and Cleveland R. Scott, Bartlesville, Okla., assignors to Phillips Petroleum Company, a corporation of Delaware No Drawing. Application January 6, 1950,
Serial No. 137,272

17 Claims. (Cl. 260—412.4)

1

This invention relates to a process for the production of oils from seeds, beans, nuts, etc. In one of its aspects, the invention relates to a process for the preparation of seeds, beans, nuts, etc., for extraction of their oil content. In another of its aspects the invention relates to a process for the preparation of a flaked material, from the seed, bean, nut or the like, which will not contain any substantial quantity of so-called "fines." In another of its aspects the invention relates to a process for the preparation of a seed, bean or nut flake wherein, any "fines" which tend to be formed are so altered that no substantial or undesired quantity of "fines," as is apparent from this disclosure, will appear in the flakes prepared. A still further aspect of the invention relates to a process for flaking a seed, bean, nut, or the like, prior to its treatment, by solvent extraction, or otherwise, to remove its oil content.

Oilseed such as cottonseed, flaxseed, soybeans, tung nuts, and the like are usually flaked prior to their treatment with a suitable solvent for the removal of oil therefrom. This flaking operation produces an increase in the surface area of the seed material and facilitates oil removal therefrom by the solvent. According to the prior art this flaking operation has been effected by passing suitably conditioned oilseed between heavy steel crushing rolls. The resulting product was a rather fragile flake which produced a substantial amount of fine material (50 mesh or smaller) both during the flaking operation and during the subsequent treatment of the flakes in the solvent extraction plant.

This so-called "fines" material has been a source of trouble in commercial solvent extraction units. In a countercurrent solvent extractor, "fines" are carried along in the miscella stream and must be removed by filtration or other suitable means. "Fines" are frequently the cause of decreased oil yields, clogged filters and centrifuges, plugged flow lines and the like. Furthermore, the miscella obtained from countercurrent extraction of conventional oilseed flakes is cloudy due to the suspended "fines" it contains.

It has now been found that it is possible to convert whole, cracked or ground oilseeds, beans, nuts or the like into flakes, which may be solvent extracted and which will contain substantially no "fines." Thus, it has been found that by grinding the seed, beans, nuts, or the like and suitably adjusting the moisture content of the said ground seeds, beans or nuts and passing the thus adjusted ground material between a pair of suitable rolls, for example, commercially available crushing rolls, which are heated to maintain the temperature of the said ground material in the approximate range of 180°–275° F., that an adherent film is formed on said rolls and that said film can be scraped from said rolls, for example, by suitable scraping knives, to form flakes without formation of "fines." Further, it has been found that flakes, without "fines" can be suitably prepared or formed by adjusting the moisture content of the ground material to cause it to adhere to unheated rolls in a thin layer which can be removed as flakes with no "fines," which flakes can then be heated to adjust their moisture content prior to solvent extraction. Furthermore, it has been found that by suitably adjusting and correlating the roll speed and roll temperature, flakes can be produced containing any desired moisture content, for example in the range of from about 7 to about 12 per cent, preferably 9 to 11 per cent and that this regulation of the moisture content is desirable for most efficaciously extracting the oil from the flakes on subsequent solvent treatment thereof. If desired the moisture content can be reduced further, say, to 0.5 per cent. It has been found further, that flakes can be prepared from oleaginous materials ranging in size from "fines" to coarser materials which in the case of cottonseed may be as large as the whole delinted and dehulled seed. Mixtures of different size materials can also be used. Still, further, it has been found that when desired, and particularly when operating with large particles, a suitable binder such as a phosphatide material, carboxymethylcellulose, or the like, can be used.

Thus, according to this invention there has been provided a process for the formation of seed, bean, nut or the like, flakes, without "fines" which comprises adjusting the moisture content of the ground seed, beans, nuts or the like to a value in the approximate range 12–20 per cent and then forming it into flakes. Still according to this invention the flakes can be formed by pressing the moisturized ground material upon rolls to form a film thereon and then removing the film, in flake form from the rolls. Still further, according to the invention, the rolls may be heated to reduce the moisture content and bind the flakes in a manner such that the said flakes have better tensile strength and are more stable against powdering or crushing than those prepared by methods of the prior art. When the rolls are not heated, the flakes are removed therefrom and heated, say in a dryer, to provide an extractable flake of similar preferred properties.

The temperature of the rolls, when heated, is, as stated, such that the ground seed, beans, nuts or the like will be heated to and maintained at a temperature in the approximate range of 180°–275° F. A similar temperature will be maintained when the cold-formed flakes are heated in a drier, after removal from the rolls.

The ground seed, beans, nuts or the like used in the process of the invention can be raw or cooked. Some cooking may occur on the heated rolls depending upon the time of contact and the temperature maintained. However, the amount of cooking thus obtained is slight. Thus, the time during which the ground material is on the roll is of the order of about 5 to about 60 seconds while the cooking, as practiced in the art, at a temperature of 160°–212° F., takes about 30 to 45 minutes.

As a feature of the invention the incorporation of a phosphatide material, carboxymethylcellulose or the like serves to further increase the strength of the flakes. Where necessary, the heating of the flakes containing, for example, gossypol, as found in cottonseed, can be prolonged to destroy the poisonous character thereof.

As a result of the practice of a process according to the invention, extraction of the improved flakes of the present invention produces a clear, solid-free miscella.

*Example I*

A run was made wherein ten pounds of commercially delinted and dehulled cottonseed was ground to "fines" (30 per cent passing 50 mesh screen). This material was then moistened to a water content of about 15 per cent and passed through a set of steel rolls heated to about 250° F. The material formed a very thin cake on the rolls and when scraped therefrom with knives provided flakes containing substantially no "fines." The speed of the rolls was adjusted to provide a moisture content in the finished flakes of about 10 per cent.

The flakes so obtained were then treated for oil removal in a continuous countercurrent solvent extraction pilot plant unit patterned after a commercial processing plant. The flakes were processed at a rate of about two pounds per hour over an uninterrupted five hour run. No plugging of filters, miscella lines or the like by "fines" was encountered. This is in sharp contrast to operation with commercial flakes which normally cause filter plugging about every hour and a miscella line stoppage on the average of about every four to eight hours of operation. Screenings from the ten mesh conveyer belt were reduced at least 90 per cent over similar screenings obtained when extracting a typical batch of commercial cottonseed flakes in a corresponding run under substantially the same conditions of operation.

*Example II*

A run was made wherein one pound of commercially delinted and dehulled cottonseed was ground to "fines" (30 per cent passing 50 mesh screen). This material was then moistened to a water content of about 15 per cent and passed through a set of steel rollers. The material formed a very thin cake on the rolls and when scraped therefrom with knives provided flakes containing substantially no "fines." These flakes were then dried in an oven to a moisture content of about 10 per cent. The flakes so obtained were stronger and more resistant to breaking than commercially prepared cottonseed flake.

*Example III*

Equal portions of a commercially delinted and dehulled cottonseed were processed to produce both the preferred flakes of our invention and flakes equivalent to those prepared by present commercial means. Equal weight samples of these respective flakes were subjected to Soxhlet extraction under the same conditions to provide the following oil yields:

| Flake of Invention | Commercial Flake |
| --- | --- |
| 37.3% oil yield<br>37.8% oil yield | 36.4% oil yield |

From the foregoing disclosure and examples it can be noted that the processes of the invention not only yield more readily processed stronger flakes resulting in a clear, solid-free miscella but also that a noticeable increase in the oil obtained upon extraction has resulted.

Reasonable variation and modification are possible within the scope of the foregoing disclosure and the appended claims to the invention the essence of which is that by adjusting the moisture content of ground seed, bean or nut meal to a value in the approximate range of 12–20 per cent and then flaking by pressure between rolls followed by heating, or flaking and heating concurrently, a stronger flake, than heretofore possible, has been obtained, an increase in the oil extractable from the meal has been obtained and of great importance and value a clear, solid-free miscella from the flakes has been obtained.

The term "seeds" as employed in the appended claims includes seeds, beans, nuts and the like as herein set forth.

We claim:

1. A process for the extraction of oil from a seed, which comprises the steps of grinding said seed; adjusting the moisture content of the ground seed to a value in the approximate range of 12–20 per cent, rolling said material so as to form a film of said material upon the roller, removing said film from said roller, forming said film into flakes, heating said flakes at a temperature in the approximate range of 180°–275° F. until their moisture content is further adjusted to a value in the approximate range 7–12 per cent and treating said flakes when their moisture content is in the range of 7–12 per cent in a continuous countercurrent solvent extraction step with an oil solvent so as to extract their oil content.

2. The process of claim 1 wherein the material is simultaneously rolled so as to form the flakes and heated so as to adjust the moisture content of the resulting flakes to a value in said range of 7–12 per cent.

3. The process of claim 1 wherein the ground seed is first rolled to form a film which is broken into flakes which are then heated so as to reduce the moisture content to a value in said range of 7–12 per cent.

4. A process according to claim 1 wherein carboxy-methyl cellulose is incorporated into the ground seed material to increase the strength of the flakes.

5. The process of forming oil seed flakes which are resistant to attrition in a solvent extraction process which comprises grinding said seed; adjusting the moisture content of resulting ground seeds in the range 12 to 20 weight per cent; rolling said ground seeds so as to form a thin layer thereof upon the rolls; removing said ground seed layer from the rolls; forming flakes from said layer; and heating said flakes so as to further adjust the moisture content to a value in the range 7 to 12 weight per cent and to bind said flakes.

6. A process for the extraction of oil from seeds which comprises grinding said seeds; forming a layer of resulting ground material upon a roller; removing said layer, forming said layer into flakes; heating said flakes for a period of time in the range 5 to 60 seconds at a temperature in the range 180° to 275° F. so as to adjust the moisture content and so as to increase their tensile strength; countercurrently contacting said flakes with an oil solvent so as to extract said oil from said flakes; separating said oil and said solvent from said flakes; and recovering said oil as a product of the process.

7. The process of forming oil seed flakes which are resistant to attrition in a solvent extraction process which comprises grinding said seed; adjusting the moisture content of resulting ground seeds; simultaneously rolling said ground seeds so as to form a thin layer thereof upon the rolls and heating at a temperature in the range 180° to 275° F. for a period of time in the range 5 to 60 seconds so as to further adjust the moisture content of and to bind the resulting flakes.

8. The process of claim 7 wherein a binder is incorporated with the ground seed.

9. The process of claim 8 wherein said binder is carboxymethylcellulose.

10. The process of forming oil seed flakes which are resistant to attrition in a solvent extraction process which comprises grinding said seed; adjusting the moisture content of resulting ground seeds; rolling said ground seeds so as to form a thin layer thereon upon the rolls; removing said ground seed layer from the rolls; forming flakes from said layer; and heating said flakes at a temperature in the range 180° to 275° F. for a period of time in the range 5 to 60 seconds so as to adjust the moisture content and so as to bind them.

11. The process of claim 10 wherein a binder is incorporated with the ground seed.

12. The process of claim 11 wherein said binder is carboxymethylcellulose.

13. The seed flakes made by the process of claim 11.

14. A process for the extraction of oil from seeds which comprises grinding said seeds; incorporating therein a binder selected from the group consisting of a phosphatide and a carboxymethylcellulose; forming a layer of resulting ground material upon a roller; removing said layer, forming said layer into flakes; heating said flakes so as to increase their tensile strength; countercurrently contacting said flakes with an oil solvent so as to extract said oil from said flakes; separating said oil and said solvent from said flakes; and recovering said oil as a product of the process.

15. Seed flakes prepared for extraction of oil therefrom which contain moisture in the range of 7 to 12 weight per cent and which have therein incorporated a binder selected from the group consisting of a phosphatide and a carboxymethylcellulose.

16. The said flakes of claim 15 wherein the binder is a phosphatide.

17. The said flakes of claim 15 wherein the binder is carboxymethylcellulose.

ARNOLD L. AYERS.
CLEVELAND R. SCOTT.

References Cited in the file of this patent

UNITED STATES PATENTS

| Number | Name | Date |
|---|---|---|
| 1,928,241 | Barton | Sept. 26, 1933 |

OTHER REFERENCES

"Cottonseed and Cottonseed Products" by A. E. Bailey, published 1948, Interscience Publishers, Inc., New York, pages 211, 617, 620.